United States Patent
Kawakami et al.

(10) Patent No.: US 9,732,663 B2
(45) Date of Patent: Aug. 15, 2017

(54) COOLING SYSTEM

(75) Inventors: Yoshiaki Kawakami, Nagoya (JP);
Yuki Jojima, Nagoya (JP); Eizo Takahashi, Chiryu (JP); Kousuke Sato, Toyota (JP); Yuichi Ohno, Nishio (JP); Kazuhide Uchida, Hamamatsu (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 745 days.

(21) Appl. No.: 14/235,969

(22) PCT Filed: Jul. 31, 2012

(86) PCT No.: PCT/IB2012/001476
§ 371 (c)(1),
(2), (4) Date: Apr. 9, 2014

(87) PCT Pub. No.: WO2013/017936
PCT Pub. Date: Feb. 7, 2013

(65) Prior Publication Data
US 2014/0216085 A1 Aug. 7, 2014

(30) Foreign Application Priority Data
Aug. 1, 2011 (JP) .................. 2011-168339

(51) Int. Cl.
*B60H 1/14* (2006.01)
*F01P 9/06* (2006.01)
(Continued)

(52) U.S. Cl.
CPC ............ *F01P 9/06* (2013.01); *B60H 1/00278* (2013.01); *B60H 1/143* (2013.01); *B60H 1/323* (2013.01);
(Continued)

(58) Field of Classification Search
CPC ........ B60K 11/00; F01P 9/06; B60H 1/00385; B60H 1/00278
See application file for complete search history.

(56) References Cited

U.S. PATENT DOCUMENTS 4,122,688 A * 10/1978 Mochizuki ............... F25B 5/02
62/196.1
6,311,507 B1 * 11/2001 Gameiro ............... F25B 43/006
62/196.4
(Continued)

FOREIGN PATENT DOCUMENTS

| JP | 61-49259 U | 4/1986 |
|----|------------|--------|
| JP | 2000-073763 A | 3/2000 |

(Continued)

OTHER PUBLICATIONS

Partial English Translation of an Office Action dated Feb. 10, 2015, issued by the Japanese Patent Office in counterpart Japanese application No. 2011-168339.

*Primary Examiner* — Len Tran
*Assistant Examiner* — Alexis Cox
(74) *Attorney, Agent, or Firm* — Sughrue Mion, PLLC

(57) ABSTRACT

A cooling system for cooling a hybrid vehicle apparatus includes a compressor that circulates a refrigerant, a first heat exchanger that carries out heat exchange between the refrigerant and outside air, an expansion valve that reduces the pressure of the refrigerant, a second heat exchanger that carries out heat exchange between the refrigerant and air-conditioning air, a cooling portion that cools the hybrid vehicle apparatus using the refrigerant that flows between the heat exchanger and the expansion valve, a gas-liquid separator that separates the refrigerant that flows between the heat exchanger and the cooling portion into a liquid-phase refrigerant and a gas-phase refrigerant, and a liquid accumulator that is provided between the gas-liquid sepa- (Continued)

rator and the cooling portion, and that retains the liquid-phase refrigerant separated by the gas-liquid separator.

11 Claims, 6 Drawing Sheets

(51) Int. Cl.
 *B60H 1/00* (2006.01)
 *B60H 1/32* (2006.01)
(52) U.S. Cl.
 CPC .............. *B60H 2001/00307* (2013.01); *B60H 2001/3288* (2013.01)

(56) References Cited

U.S. PATENT DOCUMENTS

| | | | |
|---|---|---|---|
| 9,233,594 B2* | 1/2016 | Arai | F25B 49/027 |
| 9,386,729 B2* | 7/2016 | Baerd | H05K 7/20272 |
| 2010/0293966 A1 | 11/2010 | Yokomachi et al. | |
| 2011/0108242 A1* | 5/2011 | Eichberger | B60H 1/00278 165/104.21 |
| 2013/0319038 A1* | 12/2013 | Kawase | B60H 1/00278 62/498 |
| 2014/0007613 A1* | 1/2014 | Uchida | B60H 1/004 62/509 |
| 2014/0190203 A1* | 7/2014 | Jojima | B60H 1/00278 62/511 |
| 2014/0216086 A1* | 8/2014 | Ohno | B60H 1/00278 62/228.1 |
| 2014/0238056 A1* | 8/2014 | Kawakami | F25B 31/008 62/89 |
| 2014/0290289 A1* | 10/2014 | Ohno | B60H 1/00385 62/115 |
| 2014/0326010 A1* | 11/2014 | Kawakami | B60H 1/323 62/222 |
| 2015/0000331 A1* | 1/2015 | Jojima | F25B 1/005 62/498 |
| 2015/0027162 A1* | 1/2015 | Ohno | B60H 1/00278 62/525 |

FOREIGN PATENT DOCUMENTS

| | | |
|---|---|---|
| JP | 2003-285633 A | 10/2003 |
| JP | 2005-090862 A | 4/2005 |
| JP | 2007-069733 A | 3/2007 |
| JP | 2011-001048 A | 1/2011 |

* cited by examiner

COOLING SYSTEM

BACKGROUND OF THE INVENTION

1. Field of the Invention

The invention relates to a cooling system, and more particularly, to a cooling system that cools a heat generation source through the use of a vapor compression refrigeration cycle.

2. Description of Related Art

Hybrid vehicles, fuel cell-powered vehicles, electric vehicles and the like, which run by the driving force of a motor, have been drawing attention as a measure against environmental issues. In such a vehicle, electric apparatuses such as a motor, a generator, an inverter, a converter, a battery and the like generate heat by giving/receiving electric power. Therefore, these electric apparatuses need to be cooled.

In Japanese Patent Application Publication No. 2000-73763 (JP-2000-73763 A), there is described a cooling system for a hybrid vehicle. This cooling system includes a first cooling circuit that selectively or simultaneously cools an engine cylinder head and a drive motor, a second cooling circuit that cools the engine cylinder block, and a third cooling circuit that cools a strong electric control unit that performs drive control of the drive motor.

In the cooling system described in Japanese Patent Application Publication No. 2000-73763 (JP-2000-73763 A), a system that causes cooling water to circulate between a heat generator and a radiator is employed to cool electric parts, as in the case of a normal vehicle in which only an engine thereof is cooled. Such a system needs to be newly provided with a radiator for cooling the electric parts, and hence may decrease in vehicle mountability.

Thus, there has been proposed an art of cooling a heat generator with the aid of a vapor compression refrigeration cycle that is employed as a vehicular air conditioner. For example, in Japanese Patent Application Publication No. 2007-69733 (JP-2007-69733 A), there is described a system in which a heat exchanger that exchanges heat with air-conditioning air and a heat exchanger that exchanges heat with a heat generator are arranged in parallel with each other in a refrigerant passage that extends from an expansion valve to a compressor. This system cools the heat generator through the use of a refrigerant for an air conditioner. Further, in Japanese Patent Application Publication No. 2005-90862 (JP-2005-90862 A), there is described a cooling system in which heat generator cooling means for cooling a heat generator is provided in a bypass passage that bypasses a pressure reducer, an evaporator, and a compressor in an air-conditioning refrigeration cycle.

On the other hand, as regards a vehicular air conditioner, in Japanese Patent Application Publication No. 2003-285633 (JP-2003-285633 A), there is described a device that causes a refrigerant to pass through a storage heat exchanger having a cooling storage material during the operation of a compressor, and cools the refrigerant by stored cold energy of the cooling storage material to operate an air conditioner after the stoppage of the compressor. In Japanese Patent Application Publication No. 2011-1048 (JP-2011-1048 A), there is described a vehicular air-conditioning system in which a heat storage material of an in-vehicle heat storage unit stores a certain amount of heat and the in-vehicle heat storage unit exchanges the amount of heat with a heat exchange medium through a heat exchange process.

In the cooling system described in each of Japanese Patent Application Publication No. 2007-69733 (JP-2007-69733 A) and Japanese Patent Application Publication No. 2005-90862 (JP-2005-90862 A), a cooling route for cooling the heat generation source such as an electric apparatus or the like is incorporated in a vapor compression refrigeration cycle, and a refrigerant in a two-phase state, namely, a gas-liquid state is introduced into a refrigerant route that cools the heat generation source, after having passed through a pressure reducer. When the flow rate of the liquid-phase refrigerant for cooling the heat generation source decreases, the performance of cooling the heat generation source may deteriorate.

SUMMARY OF THE INVENTION

This invention provides a cooling system that can stably cool a heat generation source.

An aspect of the invention relates to a cooling system that cools a heat generation source. The cooling system includes a compressor that circulates a refrigerant, a first heat exchanger that carries out heat exchange between the refrigerant and outside air, a pressure reducer that reduces a pressure of the refrigerant, a second heat exchanger that carries out heat exchange between the refrigerant and air-conditioning air, a cooling portion that cools the heat generation source using the refrigerant that flows between the first heat exchanger and the pressure reducer, a gas-liquid separator that separates the refrigerant that flows between the first heat exchanger and the cooling portion into a liquid-phase refrigerant and a gas-phase refrigerant, and a liquid accumulator that is provided between the gas-liquid separator and the cooling portion, and that retains the liquid-phase refrigerant separated by the gas-liquid separator.

In the foregoing aspect of the invention, the liquid-phase refrigerant may flow into the liquid accumulator to be retained in the liquid accumulator during the operation of the compressor, and may flow out from the liquid accumulator to flow to the cooling portion during the stoppage of the compressor.

The aforementioned cooling system may further include a discharge portion that forcibly discharges the liquid-phase refrigerant from the liquid accumulator.

In the foregoing aspect of the invention, a first temperature sensor for measuring a temperature of the refrigerant may be arranged upstream with respect to the flow of the refrigerant that flows into the cooling portion. A second temperature sensor for measuring a temperature of the refrigerant may be arranged downstream with respect to the flow of the refrigerant that flows out from the cooling portion. Cooling control of the heat generation source may be performed on the basis of the temperatures measured by the first temperature sensor and the second temperature sensor.

In the foregoing aspect of the invention, the refrigerant may be supplied to the cooling portion when a value of a difference between the temperatures measured by the first temperature sensor and the second temperature sensor exceeds a predetermined threshold.

The aforementioned cooling system may further include a check valve that prohibits the liquid-phase refrigerant that flows out from the liquid accumulator from flowing to the gas-liquid separator.

In the foregoing aspect of the invention, the liquid accumulator may include a movable partition portion that divides an inner space of the liquid accumulator into a liquid accommodation portion in which the refrigerant is accommodated and a gas encapsulation portion in which a gas is encapsulated.

The aforementioned cooling system may further include a first passage through which the gas-phase refrigerant separated by the gas-liquid separator flows, and a second passage through which the liquid-phase refrigerant separated by the gas-liquid separator flows. The first passage and the second passage may be connected in parallel with each other in a route of the refrigerant between the gas-liquid separator and the pressure reducer. The heat generation source may be cooled by the liquid-phase refrigerant that flows through the second passage.

The aforementioned cooling system may further include a third passage through which the refrigerant flows between the compressor and the first heat exchanger, and a communication channel that establishes communication between the third passage and a side of the second passage, the side being located closer to the pressure reducer than the cooling portion.

The aforementioned cooling system may further include a changeover valve that changes a communication state between the communication channel and the side of the second passage, the side being located closer to the pressure reducer than the cooling portion.

In the foregoing aspect of the invention, the changeover valve may cause the refrigerant to flow to the communication channel during the stoppage of the compressor.

The cooling system according to the foregoing aspect of the invention can ensure that the refrigerant in a liquid phase state flows to the heat generation source at a certain flow rate. Therefore, the cooling system can restrain the capacity to cool the heat generation source from deteriorating, and can stably cool the heat generation source.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
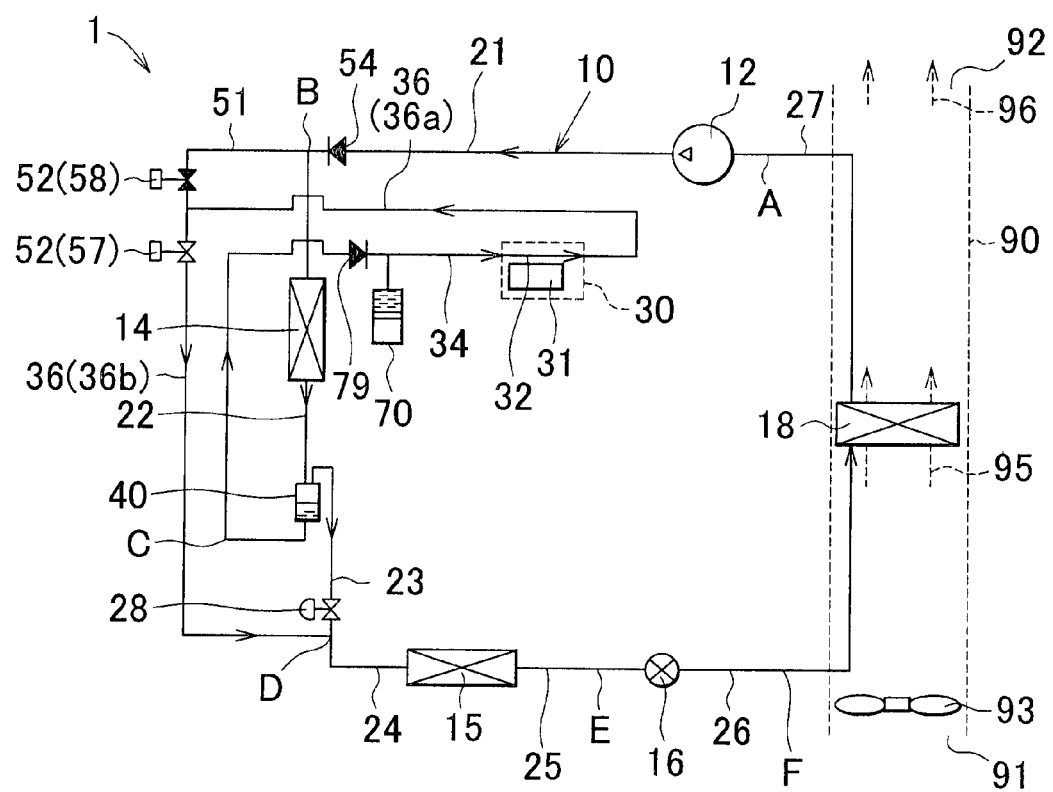
FIG. 1 is a schematic view showing the configuration of a cooling system according to the first embodiment of the invention.

Hereinafter, embodiments of this invention will be described on the basis of the drawings. It should be noted that like or equivalent components are denoted by like reference numerals in the following drawings, and that the same description of those components will not be repeated.

First Embodiment

FIG. 1 is a schematic view showing the configuration of a cooling system 1 according to the first embodiment of the invention. As shown in FIG. 1, the cooling system 1 includes a vapor compression refrigeration cycle 10. The vapor compression refrigeration cycle 10 is mounted on a vehicle so as to, for example, cool the interior of a cabin of the vehicle. The interior of the cabin is cooled through the use of the vapor compression refrigeration cycle 10, for example, when a switch for cooling is turned on, or when an automatic control mode for automatically adjusting the temperature in the cabin of the vehicle to a set temperature is selected and the temperature in the cabin is higher than the set temperature.

The vapor compression refrigeration cycle 10 includes a compressor 12, a heat exchanger 14 as a first heat exchanger, a heat exchanger 15, an expansion valve 16 as an example of a pressure reducer, and a heat exchanger 18 as a second heat exchanger.

The compressor 12 operates using as a power source a motor or engine mounted on the vehicle, and adiabatically compresses a refrigerant gas to obtain an overheated refrigerant gas. The compressor 12 sucks and compresses the refrigerant flowing therethrough from the heat exchanger 18 during the operation of the vapor compression refrigeration cycle 10, and discharges a high-temperature, high-pressure gas-phase refrigerant to a refrigerant passage 21. The compressor 12 discharges the refrigerant to the refrigerant passage 21, and thereby causes the refrigerant to circulate through the vapor compression refrigeration cycle 10.

The heat exchangers 14 and 15 isobarically radiate heat of the overheated refrigerant gas compressed by the compressor 12 to an external medium to obtain a refrigerant liquid. The high-pressure gas-phase refrigerant discharged from the compressor 12 radiates heat around the heat exchangers 14 and 15, and is cooled to condense (liquefy). Each of the heat exchangers 14 and 15 includes a tube through which the refrigerant is caused to flow, and a fin for exchanging heat between the refrigerant flowing through the tube and air around a corresponding one of the heat exchangers 14 and 15. The heat exchangers 14 and 15 exchange heat between the refrigerant and a cooling wind that is supplied through natural ventilation caused by the running of the vehicle or forcible ventilation from a cooling fan such as a radiator fan for cooling an engine or the like. Due to the heat exchange in the heat exchangers 14 and 15, the temperature of the refrigerant falls, and the refrigerant liquefies.

The expansion valve 16 expands the high-pressure liquid-phase refrigerant flowing through a refrigerant passage 25 by injecting it from a, small hole. Thus, the expansion valve 16 changes the high-pressure liquid-phase refrigerant into a low-temperature, low-pressure misty refrigerant. The expansion valve 16 reduces the pressure of the refrigerant liquid condensed by the heat exchangers 14 and 15 to obtain wet vapors in a gas-liquid mixed state. It should be noted that the pressure reducer for reducing the pressure of the refrigerant liquid is not limited to the expansion valve 16 that expands in a throttling manner, but may be a capillary tube.

The misty refrigerant flowing through the heat exchanger 18 gasifies. The heat exchanger 18 thereby absorbs the heat of ambient air that has been so introduced as to come into contact with the heat exchanger 18. Using the refrigerant whose pressure has been reduced by the expansion valve 16, the heat exchanger 18 absorbs, from air-conditioning air flowing into the cabin of the vehicle, vaporization heat that is required when the wet vapors of the refrigerant vaporize to become the refrigerant gas, thereby cooling the interior of the cabin of the vehicle. The air-conditioning air whose temperature has fallen through the absorption of the heat by the heat exchanger 18 is returned to the interior of the cabin again, so that the interior of the cabin of the vehicle is cooled. The refrigerant absorbs heat from around the heat exchanger 18, and is heated.

The heat exchanger 18 includes a tube through which the refrigerant is caused to flow, and a fin for exchanging heat between the refrigerant flowing through the tube and air around the heat exchanger 18. The refrigerant in a wet vapor state flows through the tube. In flowing through the tube, the refrigerant vaporizes by absorbing the heat of air in the cabin of the vehicle as evaporative latent heat via the fin, and then becomes overheated vapors due to sensible heat. The gasified refrigerant flows into the compressor 12 via a refrigerant passage 27. The compressor 12 compresses the refrigerant flowing therethrough from the heat exchanger 18.

The vapor compression refrigeration cycle 10 further includes the refrigerant passage 21 as a third passage through which the compressor 12 and the heat exchanger 14 communicate with each other, refrigerant passages 22, 23, and 24 through which the heat exchanger 14 and the heat exchanger 15 communicate with each other, the refrigerant passage 25 through which the heat exchanger 15 and the expansion valve 16 communicate with each other, a refrigerant passage 26 through which the expansion valve 16 and the heat exchanger 18 communicate with each other, and the refrigerant passage 27 through which the heat exchanger 18 and the compressor 12 communicate with each other.

The refrigerant passage 21 is a passage for causing the refrigerant to flow through from the compressor 12 into the heat exchanger 14. The refrigerant flows from an outlet of the compressor 12 toward an inlet of the heat exchanger 14, between the compressor 12 and the heat exchanger 14, via the refrigerant passage 21. The refrigerant passages 22 to 25 are passages for causing the refrigerant to flow through from the heat exchanger 14 into the expansion valve 16. The refrigerant flows from an outlet of the heat exchanger 14 toward an inlet of the expansion valve 16, between the heat exchanger 14 and the expansion valve 16, via the refrigerant passages 22 to 25.

The refrigerant passage 26 is a passage for causing the refrigerant to flow through from the expansion valve 16 into the heat exchanger 18. The refrigerant flows from an outlet of the expansion valve 16 toward an inlet of the heat exchanger 18, between the expansion valve 16 and the heat exchanger 18, via the refrigerant passage 26. The refrigerant passage 27 is a passage for causing the refrigerant to flow through from the heat exchanger 18 into the compressor 12. The refrigerant flows from an outlet of the heat exchanger 18 toward an inlet of the compressor 12, between the heat exchanger 18 and the compressor 12, via the refrigerant passage 27.

The vapor compression refrigeration cycle 10 is constituted by coupling the compressor 12, the heat exchangers 14 and 15, the expansion valve 16, and the heat exchanger 18 to one another via the refrigerant passages 21 to 27. It should be noted that, for example, carbon dioxide, a hydrocarbon such as propane, isobutane or the like, ammonia, water or the like can be used as the refrigerant for the vapor compression refrigeration cycle 10.

The vapor compression refrigeration cycle 10 further includes a gas-liquid separator 40 arranged on a route of the refrigerant that flows between the heat exchanger 14 and the expansion valve 16. The gas-liquid separator 40 separates the refrigerant that flows out from the heat exchanger 14 into the gas-phase refrigerant and the liquid-phase refrigerant. A refrigerant liquid as the liquid-phase refrigerant and refrigerant vapors as the gas-phase refrigerant are stored inside the gas-liquid separator 40. The refrigerant passages 22 and 23 and the refrigerant passage 34 are coupled to the gas-liquid separator 40.

The refrigerant assumes a state of wet vapors in a gas-liquid two-phase state as a mixture of a saturated liquid and saturated vapors on the outlet side of the heat exchanger 14. The refrigerant that has flowed out from the heat exchanger 14 is supplied to the gas-liquid separator 40 through the refrigerant passage 22. The refrigerant in the gas-liquid two-phase state, which flows from the refrigerant passage 22 into the gas-liquid separator 40, is separated into a gas phase and a liquid phase inside the gas-liquid separator 40. The gas-liquid separator 40 separates the refrigerant condensed by the heat exchanger 14 into the refrigerant liquid in a liquid state and the refrigerant vapors in a gaseous state, and temporarily stores them.

The separated refrigerant liquid flows out to the outside of the gas-liquid separator 40 via the refrigerant passage 34. An end of the refrigerant passage 34 arranged in the liquid phase in the gas-liquid separator 40 forms a flow outlet through which the liquid-phase refrigerant flows out from the gas-liquid separator 40. The separated refrigerant vapors flow out to the outside of the gas-liquid separator 40 via the refrigerant passage 23. An end of the refrigerant passage 23 that is arranged in the gas phase in the gas-liquid separator 40 forms a flow outlet through which the gas-phase refrigerant flows out from the gas-liquid separator 40. The gas-phase refrigerant vapors derived from the gas-liquid separator 40 radiate heat around the heat exchanger 15 as a third heat exchanger, and are cooled to condense.

The refrigerant liquid accumulates in a lower region of the gas-liquid separator 40, and the refrigerant vapors accumulate in an upper region of the gas-liquid separator 40. An end of the refrigerant passage 34 through which the refrigerant liquid is derived from the gas-liquid separator 40 is coupled to a bottom portion of the gas-liquid separator 40. Only the refrigerant liquid is delivered to the outside of the gas-liquid separator 40 from the bottom side of the gas-liquid separator 40 via the refrigerant passage 34. An end of the refrigerant passage 23 through which the refrigerant vapors are derived from the gas-liquid separator 40 is coupled to a ceiling portion of the gas-liquid separator 40. Only the refrigerant vapors are delivered to the outside of the gas-liquid separator 40 from the ceiling side of the gas-liquid separator 40 via the refrigerant passage 23. Due to the delivered refrigerant vapors, the gas-liquid separator 40 can reliably separate the gas-phase refrigerant and the liquid-phase refrigerant from each other.

The route through which the refrigerant flows from the outlet of the heat exchanger 14 toward the inlet of the expansion valve 16 includes the refrigerant passage 22 that extends from the outlet side of the heat exchanger 14 to the gas-liquid separator 40, the refrigerant passage 23 through which the refrigerant vapors are caused to flow out from the gas-liquid separator 40 and which extends via a later-described flow rate adjusting valve 28, the refrigerant passage 24 coupled to the inlet side of the heat exchanger 15, and the refrigerant passage 25 through which the refrigerant is caused to flow from the outlet side of the heat exchanger 15 to the expansion valve 16. The gas-phase refrigerant separated by the gas-liquid separator 40 flows through the refrigerant passage 23 as the first passage.

The route through which the refrigerant flows between the heat exchanger 14 and the heat exchanger 15 further includes the refrigerant passage 34 through which the gas-liquid separator 40 and a cooling portion 30 communicate with each other, and a refrigerant passage 36 through which the cooling portion 30 and the refrigerant passage 24 communicate with each other. The refrigerant liquid flows from the gas-liquid separator 40 into the cooling portion 30 via the refrigerant passage 34. The refrigerant that has passed through the cooling portion 30 returns to the refrigerant passage 24 via the refrigerant passage 36. The liquid-phase refrigerant separated by the gas-liquid separator 40 flows through the refrigerant passages 34 and 36 as the second passage. Within the first passage (the refrigerant passage 23) and the second passage (the refrigerant passages 34 and 36) that are connected in parallel with each other on the route through which the refrigerant flows from the heat exchanger 14 toward the heat exchanger 15 between the gas-liquid separator 40 and the expansion valve 16, the cooling portion 30 is provided on the second passage.

A point D shown in FIG. 1 indicates a coupling point of the refrigerant passage 23, the refrigerant passage 24, and the refrigerant passage 36. That is, the point D indicates a downstream end of the refrigerant passage 23 (i.e., an end in a side close to the heat exchanger 15), an upstream end of the refrigerant passage 24 (i.e., an end in a side close to the heat exchanger 14), and a downstream end of the refrigerant passage 36. The refrigerant passage 23 forms a part of the route through which the refrigerant flows from the gas-liquid separator 40 toward the expansion valve 16. This part extends from the gas-liquid separator 40 to the point D.

The cooling system 1 includes a refrigerant route arranged in parallel with the refrigerant passage 23, and the cooling portion 30 is provided on the refrigerant route. The cooling portion 30 includes a hybrid vehicle (HV) apparatus 31 as an electric apparatus mounted on the vehicle, and a cooling passage 32 as a pipeline through which the refrigerant flows. The HV apparatus 31 is an example of a heat generation source. One end of the cooling passage 32 is connected to the refrigerant passage 34. The other end of the cooling passage 32 is connected to the refrigerant passage 36.

The refrigerant route that is connected in parallel with the refrigerant passage 23 between the gas-liquid separator 40 and the point D shown in FIG. 1 includes the refrigerant passage 34 which is located upstream of (on the upstream side of) the cooling portion 30 (i.e., on a side close to the gas-liquid separator 40), the cooling passage 32 included in the cooling portion 30, and the refrigerant passage 36 which is located downstream of (on the downstream side of) the cooling portion 30 (i.e., on a side close to the heat exchanger 15). The refrigerant passage 34 is a passage for causing the liquid-phase refrigerant to flow through from the gas-liquid separator 40 into the cooling portion 30. The refrigerant passage 36 is a passage for causing the refrigerant to flow through from the cooling portion 30 to the point D. The point D is a branching point between the refrigerant passages 23 and 24 and the refrigerant passage 36.

The refrigerant liquid that has flowed out from the gas-liquid separator 40 flows toward the cooling portion 30 via the refrigerant passage 34. The refrigerant that flows into the cooling portion 30 and via the cooling passage 32 removes heat from the HV apparatus 31 as a heat generation source, and cools the HV apparatus 31. The cooling portion 30 cools the HV apparatus 31, using the liquid-phase refrigerant that is separated in the gas-liquid separator 40 and flows to the cooling passage 32 via the refrigerant passage 34. In the cooling portion 30, the refrigerant flowing through the cooling passage 32 and the HV apparatus 31 exchange heat with each other. As a result, the HV apparatus 31 is cooled, and the refrigerant is heated. In addition, the refrigerant flows from the cooling portion 30 toward the point D via the refrigerant passage 36, and reaches the heat exchanger 15 via the refrigerant passage 24.

The cooling portion 30 is so provided as to have a structure that allows heat exchange between the HV apparatus 31 and the refrigerant in the cooling passage 32. In this embodiment of the invention, the cooling portion 30 has the cooling passage 32 that is formed, for example, such that an outer peripheral face of the cooling passage 32 is in direct contact with a case of the HV apparatus 31. The cooling passage 32 has a region that is adjacent to the case of the HV apparatus 31. In this region, the refrigerant flowing through the cooling passage 32 and the HV apparatus 31 can exchange heat with each other.

The HV apparatus 31 is directly connected to the outer peripheral face of the cooling passage 32, which forms a part of the refrigerant route extending from the heat exchanger 14 to the heat exchanger 15 in the vapor compression refrigeration cycle 10, and thus the HV apparatus 31 is cooled. The HV apparatus 31 is arranged outside the cooling passage 32, and hence does not interfere with the flow of the refrigerant that flows through in the cooling passage 32. For this reason, the pressure loss of the vapor compression refrigeration cycle 10 does not increase. Therefore, the HV apparatus 31 can be cooled without increasing the power of the compressor 12.

Alternatively, the cooling portion 30 may include an ordinary heat pipe that is so arranged as to be interposed between the HV apparatus 31 and the cooling passage 32. In this case, the HV apparatus 31 is connected to the outer peripheral face of the cooling passage 32 via the heat pipe, and is cooled through heat transfer from the HV apparatus 31 to the cooling passage 32 via the heat pipe. The heat transfer efficiency between the cooling passage 32 and the HV apparatus 31 is enhanced by using the HV apparatus 31 as a heating portion for the heat pipe and using the cooling passage 32 as a cooling portion for the heat pipe. Therefore, the efficiency of cooling the HV apparatus 31 can be enhanced. For example, a Wick heat pipe can be employed.

Heat can be reliably transferred from the HV apparatus 31 to the cooling passage 32 by the heat pipe. Therefore, there may be a certain distance between the HV apparatus 31 and the cooling passage 32. There is no need to arrange the cooling passage 32 in a complicated manner to bring the cooling passage 32 into contact with the HV apparatus 31. As a result, the degree of freedom in arranging the HV apparatus 31 can be enhanced.

The HV apparatus 31 includes an electric apparatus that generates heat by giving/receiving an electric power. The electric apparatus includes, for example, at least one of an inverter for converting a direct-current electric power into an alternating-current electric power, a motor-generator as a rotating electrical machine, a battery as an electrical storage device, a converter for stepping up the voltage of the battery, a DC/DC converter for stepping down the voltage of the battery, and the like. The battery is a secondary battery such as a lithium-ion battery, a nickel hydride battery, or the like. A capacitor may be employed instead of the battery.

The heat exchanger 18 is arranged inside a duct 90 through which air flows. The heat exchanger 18 carries out heat exchange between the refrigerant and the air-conditioning air flowing through the duct 90, and hence adjusts the temperature of the air-conditioning air. The duct 90 has a duct inlet 91 as an inlet through which the air-conditioning air flows into the duct 90, and a duct outlet 92 through which the air-conditioning air flows out from the duct 90. A fan 93 is arranged in the vicinity of the duct inlet 91 inside the duct 90.

Air flows through in the duct 90 through the driving of the fan 93. When the fan 93 operates, the air-conditioning air flows into the duct 90 via the duct inlet 91. The air that flows into the duct 90 may be outside air, or air in the cabin of the vehicle. Arrows 95 in FIG. 1 indicate the flow of the air-conditioning air that flows through via the heat exchanger 18 and exchanges heat with the refrigerant in the vapor compression refrigeration cycle 10. During cooling operation, the air-conditioning air is cooled in the heat exchanger 18, and the refrigerant is heated upon receiving the heat transferred from the air-conditioning air. Arrows 96 indicate the flow of the air-conditioning air whose temperature is adjusted by the heat exchanger 18 and which flows out from the duct 90 via the duct outlet 92.

The refrigerant circulates in the vapor compression refrigeration cycle 10 through a refrigerant circulation flow channel that is formed by sequentially connecting the compressor 12, the heat exchangers 14 and 15, the expansion valve 16, and the heat exchanger 18 by the refrigerant passages 21 to 27. The refrigerant flows past a point A, a point B, a point C, the point D, a point E, and a point F as shown in FIG. 1 in this order in the vapor compression refrigeration cycle 10. The refrigerant thereby circulates through the compressor 12, the heat exchangers 14 and 15, the expansion valve 16, and the heat exchanger 18.

Figure 2:
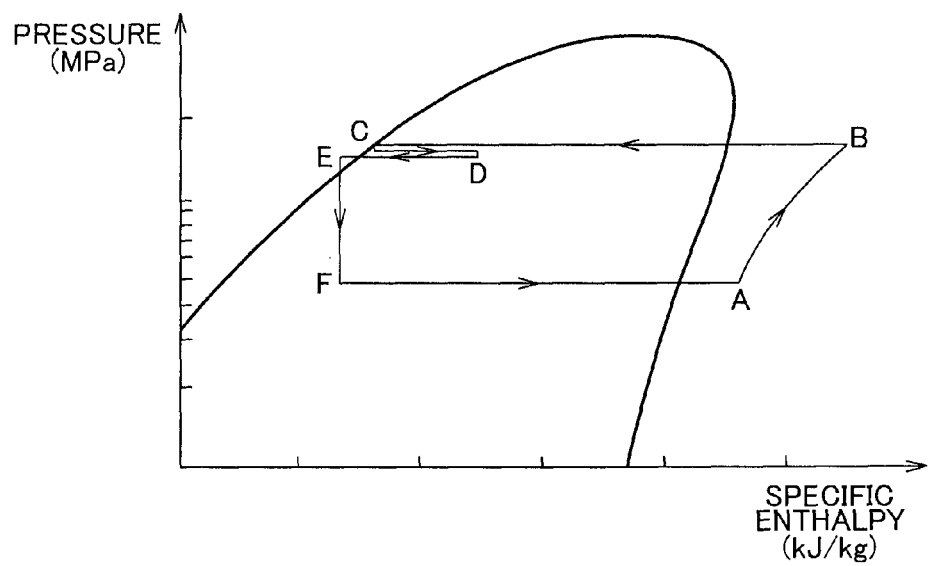
FIG. 2 is a Mollier chart showing the state of a refrigerant in a vapor compression refrigeration cycle.

FIG. 2 is a Mollier chart showing a state of the refrigerant in the vapor compression refrigeration cycle 10. The axis of abscissa in FIG. 2 represents a specific enthalpy (unit: kJ/kg) of the refrigerant, and the axis of ordinate in FIG. 2 represents an absolute pressure (unit: MPa) of the refrigerant. A curve in FIG. 2 indicates a saturated vapor curve of the refrigerant and a saturated liquid curve of the refrigerant. FIG. 2 shows thermodynamic states of the refrigerant that flows from the refrigerant passage 22 at the outlet of the heat exchanger 14 into the refrigerant passage 34 via the gas-liquid separator 40, cools the HV apparatus 31, and returns from the refrigerant passage 36 to the refrigerant passage 24 at the inlet of the heat exchanger 15 via the point D at the respective points (i.e., the points A, B, C, D, E, and F) in the vapor compression refrigeration cycle 10.

As shown in FIG. 2, the refrigerant in an overheated vapor state (at the point A), which has been sucked into the compressor 12, is adiabatically compressed along an iso-specific entropy line in the compressor 12. As the refrigerant is compressed, the pressure and temperature of the refrigerant rise. The refrigerant then becomes high-temperature, high-pressure overheated vapors with a high degree of overheat (at the point B), and flows to the heat exchanger 14. The gas-phase refrigerant discharged from the compressor 12 radiates heat around the heat exchanger 14, and is cooled to thereby condense (liquefy). Due to the exchange of heat with outside air in the heat exchanger 14, the temperature of the refrigerant falls, and the refrigerant liquefies. The high-pressure refrigerant vapors that have entered the heat exchanger 14 isobarically turn from overheated vapors to dry saturated vapors in the heat exchanger 14, radiate condensation latent heat, gradually liquefy, and become wet vapors in a gas-liquid mixed state. In the refrigerant in a gas-liquid two-phase state, the condensed refrigerant is in a saturated liquid state (at the point C).

The refrigerant is separated into the gas-phase refrigerant and the liquid-phase refrigerant in the gas-liquid separator 40. Within the refrigerant subjected to gas-liquid separation, the liquid-phase refrigerant liquid flows from the gas-liquid separator 40 to the cooling passage 32 of the cooling portion 30 via the refrigerant passage 34, and cools the HV apparatus 31. In the cooling portion 30, heat is radiated to the liquid refrigerant in a saturated liquid state, which has been condensed while passing through the heat exchanger 14, so that the HV apparatus 31 is cooled. Due to the exchange of heat with the HV apparatus 31, the refrigerant is heated, and the degree of dryness of the refrigerant increases. The refrigerant receives latent heat from the HV apparatus 31, partially gasifies, and becomes wet vapors as a mixture of a saturated liquid and saturated vapors (at the point D).

After passing through the point D, the refrigerant flows into the heat exchanger 15. The wet vapors of the refrigerant exchange heat with outside air in the heat exchanger 15, and are cooled to be condensed again. When the entire refrigerant condenses, it becomes a saturated liquid. In addition, the refrigerant radiates sensible heat and becomes an overcooled liquid that has been overcooled (at the point E). After passing the point E, the refrigerant flows into the expansion valve 16 via the refrigerant passage 25. In the expansion valve 16, the refrigerant in an overcooled liquid state is expanded in a throttling manner. The specific enthalpy of the refrigerant does not change, but the temperature and pressure of the refrigerant fall. The refrigerant then becomes low-temperature, low-pressure wet vapors in a gas-liquid mixture state (at the point F).

The refrigerant in a wet vapor state, which has left the expansion valve 16, flows into the heat exchanger 18 via the refrigerant passage 26. The refrigerant in a wet vapor state flows into the tube of the heat exchanger 18. In flowing through in the tube of the heat exchanger 18, the refrigerant flows via the fin, absorbs the heat of air in the cabin of the vehicle as evaporative latent heat, and thereby evaporates isobarically. When the entire refrigerant becomes dry saturated vapors, the refrigerant vapors further rise in temperature due to sensible heat, and become overheated vapors (at the point A). After passing the point A, the refrigerant is sucked into the compressor 12 via the refrigerant passage 27. The compressor 12 compresses the refrigerant that flows therethrough from the heat exchanger 18.

In accordance with a cycle as described above, the refrigerant continuously repeats changes in state among compression, condensation, throttle expansion, and evaporation. It should be noted that although a theoretical refrigeration cycle has been explained in the description of the aforementioned vapor compression refrigeration cycle, the loss in the compressor 12, the pressure loss of the refrigerant, and the heat loss of the refrigerant need to be taken into account in the actual vapor compression refrigeration cycle 10.

During the operation of the vapor compression refrigeration cycle 10, the refrigerant absorbs vaporization heat from the air in the cabin of the vehicle in vaporizing in the heat exchanger 18 that serves as an evaporator, and cools the interior of the cabin. In addition, the high-pressure liquid refrigerant that has flowed out from the heat exchanger 14 and has been subjected to gas-liquid separation in the gas-liquid separator 40 flows through to the cooling portion 30, and exchanges heat with the HV apparatus 31, thereby cooling the HV apparatus 31. The cooling system 1 cools the HV apparatus 31 as a heat generation source mounted on the vehicle, through the use of the vapor compression refrigeration cycle 10 for, air-conditioning in the cabin of the vehicle. It should be noted that the temperature needed to cool the HV apparatus 31 may be a temperature that is at least lower than an upper limit of a temperature range serving as a target temperature range of the HV apparatus 31.

The cooling system 1 cools the HV apparatus 31 through the use of the vapor compression refrigeration cycle 10, which is provided to cool a cooled portion in the heat exchanger 18. Therefore, there is no need to provide an apparatus such as a dedicated water circulation pump, a cooling fan, or the like to cool the HV apparatus 31. Thus, the number of components of the cooling system 1 for the HV apparatus 31 can be reduced, and the configuration of the system can be simplified. Therefore, the cost of manufacturing the cooling system 1 can be reduced. In addition, the cooling system 1 is not required to operate a power source such as a pump, a cooling fan or the like so as to cool the HV apparatus 31, and does not necessitate the power consumption for operating the power source. Accordingly, the power consumption for cooling the HV apparatus 31 can be reduced.

In the heat exchanger 14, the refrigerant may be cooled to a wet vapor state. The refrigerant in a gas-liquid mixture state is separated by the gas-liquid separator 40, and only the refrigerant liquid in a saturated liquid state is supplied to the cooling portion 30. The refrigerant in a wet vapor state, which has received evaporative latent heat from the HV apparatus 31 and has partially gasified, is cooled again in the heat exchanger 15. Until the refrigerant in a wet vapor state is condensed to be completely turned into a saturated liquid, it changes in state at a certain temperature. Furthermore, the heat exchanger 15 overcools the liquid-phase refrigerant to an overcool degree that is needed to cool the interior of the cabin of the vehicle. Since there is no need to excessively increase the overcool degree of the refrigerant, the cooling system 1 can reduce the capacities of the heat exchangers 14 and 15. Accordingly, the cooling system 1 can ensure the cooling capacity for the cabin, and can reduce the size of the heat exchangers 14 and 15. Therefore, the cooling system 1 that is compact and advantageously mountable on a vehicle can be obtained.

The refrigerant passage 23, which forms a part of the route of the refrigerant that flows from the outlet of the heat exchanger 14 toward the inlet of the expansion valve 16, is provided between the heat exchanger 14 and the heat exchanger 15. As a route through which the refrigerant flows from the gas-liquid separator 40 toward the expansion valve 16, the refrigerant passage 23 as a route that does not extend past the cooling portion 30, and the refrigerant passages 34 and 36 and the cooling passage 32 as a route for the refrigerant that flows via the cooling portion 30 to cool the HV apparatus 31 are provided in parallel with one another. A cooling system for the HV apparatus 31, which includes the refrigerant passages 34 and 36, is connected in parallel with the refrigerant passage 23. Thus, only a part of the refrigerant that has flowed out from the heat exchanger 14 flows to the cooling portion 30. The refrigerant is caused to flow through to the cooling portion 30 in an amount that is needed to cool the HV apparatus 31, and the HV apparatus 31 is appropriately cooled. Accordingly, the cooling system 1 can prevent the HV apparatus 31 from being overcooled.

The route through which the refrigerant flows from the heat exchanger 14 directly to the heat exchanger 15, and the route through which the refrigerant flows from the heat exchanger 14 to the heat exchanger 15 via the cooling portion 30 are provided in parallel with each other, and only a part of the refrigerant is caused to flow through to the refrigerant passages 34 and 36. Thus, the cooling system 1 can reduce the pressure loss that is caused when the refrigerant flows to the cooling system for the HV apparatus 31. Since not all of the refrigerant flows to the cooling portion 30, the cooling system 1 can reduce the pressure loss regarding the flow of the refrigerant that flows through via the cooling portion 30. In consequence, the electric power consumption needed for the operation of the compressor 12 for causing the refrigerant to circulate can be reduced.

If the low-temperature, low-pressure refrigerant that has passed through the expansion valve 16 is used to cool the HV apparatus 31, the cooling capacity to cool the air in the cabin diminishes in the heat exchanger 18, and the cooling capacity for the cabin deteriorates. In contrast, according to the cooling system 1, in the vapor compression refrigeration cycle 10, the high-pressure refrigerant discharged from the compressor 12 is condensed by both the heat exchanger 14 as a first condenser and the heat exchanger 15 as a second condenser. Two-stage heat exchangers, namely, the heat exchangers 14 and 15 are arranged between the compressor 12 and the expansion valve 16. The cooling portion 30 that cools the HV apparatus 31 is provided between the heat exchanger 14 and the heat exchanger 15. The heat exchanger 15 is provided on the route through which the refrigerant flows from the cooling portion 30 toward the expansion valve 16.

The refrigerant that has been heated after receiving evaporative latent heat from the HV apparatus 31 is sufficiently cooled in the heat exchanger 15. Thus, at the outlet of the expansion valve 16, the refrigerant has a temperature and a pressure that are intrinsically needed to cool the interior of the cabin of the vehicle. Thus, the cooling system 1 can sufficiently increase the amount of the heat that is received from the outside by the refrigerant at the time of evaporation in the heat exchanger 18. In this manner, the cooling system 1 determines the heat radiation capacity of the heat exchanger 15 that allows the refrigerant to be sufficiently cooled, and hence can cool the HV apparatus 31 without influencing the cooling capacity to cool the air in the cabin. Accordingly, the capacity to cool the HV apparatus 31 and the cooling capacity for the cabin can be reliably ensured.

The refrigerant that flows from the heat exchanger 14 to the cooling portion 30 receives heat from the HV apparatus 31 to be heated, in cooling the HV apparatus 31. When the refrigerant is heated to a temperature equal to or higher than a saturated vapor temperature in the cooling portion 30 and the entire refrigerant gasifies, the amount of heat exchange between the refrigerant and the HV apparatus 31 decreases, the HV apparatus 31 cannot be efficiently cooled, and the pressure loss during the flow of the refrigerant in the pipeline increases. Thus, the refrigerant may be sufficiently cooled in the heat exchanger 14 to such an extent that the entire refrigerant does not gasify after cooling the HV apparatus 31.

More specifically, the state of the refrigerant at the outlet of the heat exchanger 14 is made close to a saturated liquid state. Typically, the refrigerant is caused to assume a state of being on a saturated liquid line at the outlet of the heat exchanger 14. As described hitherto, the heat exchanger 14 has the capacity to sufficiently cool the refrigerant, so that the heat radiation capacity of the heat exchanger 14 to radiate heat from the refrigerant is higher than the heat radiation capacity of the heat exchanger. 15. By sufficiently cooling the refrigerant in the heat exchanger 14 whose heat radiation capacity is relatively large, the cooling system 1 makes it possible to hold the refrigerant that has received heat from the HV apparatus 31 in a wet vapor state, to prevent the amount of heat exchange between the refrigerant and the HV apparatus 31 from decreasing, and therefore, to sufficiently efficiently cool the HV apparatus 31. After cooling the HV apparatus 31, the refrigerant in a wet vapor state is efficiently cooled again in the heat exchanger 15, and is cooled to be an overcooled liquid whose temperature is lower than a saturation temperature. Accordingly, the cooling system 1 that ensures both the cooling capacity for the cabin and the cooling capacity for the HV apparatus 31 can be provided.

The refrigerant that is in a gas-liquid two-phase state at the outlet of the heat exchanger 14 is separated into a gas phase and a liquid phase in the gas-liquid separator 40. The gas-phase refrigerant separated by the gas-liquid separator 40 flows through via the refrigerant passages 23 and 24 to be directly supplied to the heat exchanger 15. The liquid-phase refrigerant separated by the gas-liquid separator 40 flows through via the refrigerant passage 34, and is supplied to the cooling portion 30 to cool the HV apparatus 31. This liquid-phase refrigerant is a refrigerant in a truly saturated liquid state, which is neither excessive nor insufficient. By taking out only the liquid-phase refrigerant from the gas-liquid separator 40 and causing the liquid-phase refrigerant to flow to the cooling portion 30, the cooling system 1 makes it possible to cool the HV apparatus 31 with the capacity of the heat exchanger 14 utilized to the utmost. Therefore, the cooling system 1 whose capacity to cool the HV apparatus 31 has been enhanced can be provided.

By introducing the refrigerant that is in a saturated liquid state at the outlet of the gas-liquid separator 40 into the cooling passage 32 through which the HV apparatus 31 is cooled, the cooling system 1 can minimize the amount of the refrigerant in a gas phase state, within the refrigerant flowing through the cooling system for the HV apparatus 31 that includes the refrigerant passages 34 and 36 and the cooling passage 32. Thus, the pressure loss can be restrained from increasing due to an increase in the flow velocity of the refrigerant vapors flowing, through the cooling system for the HV apparatus 31, and the electric power consumption of the compressor 12 for causing the refrigerant to flow through can be reduced. Therefore, the cooling system 1 can avoid a deterioration in the performance of the vapor compression refrigeration cycle 10.

The refrigerant liquid in a saturated liquid state is retained inside the gas-liquid separator 40. The gas-liquid separator 40 has a function of temporarily retaining the refrigerant liquid as a liquid refrigerant. A predetermined amount of the refrigerant liquid is accumulated in the gas-liquid separator 40, so that the cooling system 1 can maintain a certain flow rate of the refrigerant flowing from the gas-liquid separator 40 to the cooling portion 30 even at the time of fluctuations in load. The gas-liquid separator 40 has a liquid retaining function, serves as a buffer for fluctuations in load, and hence can absorb fluctuations in load. Therefore, the cooling system 1 can stabilize the performance of cooling the HV apparatus 31.

Referring again to FIG. 1, the cooling system 1 includes the flow rate adjusting valve 28. The flow rate adjusting valve 28 is arranged in the refrigerant passage 23, which forms one of the routes that are connected in parallel with each other among the routes of the refrigerant flowing from the heat exchanger 14 toward the expansion valve 16. The flow rate adjusting valve. 28 fluctuates the valve opening degree thereof to increase/reduce the pressure loss of the refrigerant flowing through the refrigerant passage 23, thereby arbitrarily adjusting the flow rate of the refrigerant flowing through the refrigerant passage 23, and the flow rate of the refrigerant flowing through the cooling system for the HV apparatus 31, which includes the cooling passage 32.

For example, when the flow rate adjusting valve 28 is fully closed to make the valve opening degree thereof equal to 0%, the entire refrigerant that has left the heat exchanger 14 flows from the gas-liquid separator 40 into the refrigerant passage 34. When the valve opening degree of the flow rate adjusting valve 28 is increased, the flow rate of the refrigerant that directly flows to the heat exchanger 15 via the refrigerant passage 23 increases, and the flow rate of the refrigerant that flows to the cooling passage 32 via the refrigerant passage 34 to cool the HV apparatus 31 decreases, within the refrigerant that flows from the heat exchanger 14 to the refrigerant passage 22. When the valve opening degree of the flow rate adjusting valve 28 is reduced, the flow rate of the refrigerant that directly flows to the heat exchanger 15 via the refrigerant passage 23 decreases, and the flow rate of the refrigerant that flows via the cooling passage 32 to cool the HV apparatus 31 increases, within the refrigerant that flows from the heat exchanger 14 to the refrigerant passage 22.

When the valve opening degree of the flow rate adjusting valve 28 is increased, the flow rate of the refrigerant that cools the HV apparatus 31 decreases, and the capacity to cool the HV apparatus 31 decreases. When the valve opening degree of the flow rate adjusting valve 28 is reduced, the flow rate of the refrigerant that cools the HV apparatus 31 increases, and the capacity to cool the HV apparatus 31 increases. The amount of the refrigerant flowing to the HV apparatus 31 can be optimally adjusted using the flow rate adjusting valve 28. Therefore, the cooling system 1 can reliably prevent the HV apparatus 31 from being overcooled. In addition, the cooling system 1 can reliably reduce the pressure loss regarding the flow of the refrigerant in the cooling system for the HV apparatus 31, and the electric power consumption of the compressor 12 for causing the refrigerant to circulate.

The cooling system 1 further includes a communication channel 51. The communication channel 51 establishes communication between the refrigerant passage 21 through which the refrigerant flows between the compressor 12 and the heat exchanger 14, and one of the refrigerant passages 34 and 36 through which the refrigerant is caused to flow to the cooling portion 30, more specifically, the refrigerant passage 36 that is located downstream of the cooling portion 30. The refrigerant passage 36 and the communication channel 51 are provided with changeover valves 52 that change communication states between the communication channel 51 and the refrigerant passages 21 and 36. The changeover valves 52 are switched between an open state and a closed state. This makes it possible or impossible for the refrigerant to flow via the communication channel 51. The refrigerant passage 36 is divided into two passages, namely, a refrigerant passage 36a that is located upstream of a branching point between the refrigerant passage 36 and the communication channel 51, and a refrigerant passage 36b that is located downstream of the branching point between the refrigerant passage 36 and the communication channel 51.

By making a changeover in the route of the refrigerant through the use of the changeover valves 52, the cooling system 1 can arbitrarily select one of the routes and cause the refrigerant that has cooled the HV apparatus 31 to flow through to the heat exchanger 15 via the refrigerant passages 36b and 24, or to the heat exchanger 14 via the communication channel 51 and the refrigerant passage 21.

More specifically, two valves 57 and 58 are provided as the changeover valves 52. During cooling operation of the vapor compression refrigeration cycle 10, the valve 57 is fully open (the valve opening degree is 100%) and the valve 58 is fully closed (the valve opening degree is 0%), and the valve opening degree of the flow rate adjusting valve 28 is adjusted such that a sufficient amount of the refrigerant flows to the cooling portion 30. Thus, the cooling system 1 can reliably cause the refrigerant that flows through the refrigerant passage 36a after cooling the HV apparatus 31 to flow through to the heat exchanger 15 via the refrigerant passage 36b. On the other hand, during the stoppage of the vapor compression refrigeration cycle 10, the valve 58 is fully open and the valve 57 is fully closed, and besides, the flow rate adjusting valve 28 is fully closed. Thus, the cooling system 1 can cause the refrigerant that flows through the refrigerant passage 36a after cooling the HV apparatus 31 to flow through to the heat exchanger 14 via the communication channel 51. Thus, an annular route, through which the refrigerant is caused to circulate, is formed between the cooling portion 30 and the heat exchanger 14.

The cooling system 1 further includes a liquid accumulator 70 connected to the refrigerant passage 34. The liquid accumulator 70 is provided on the route of the refrigerant that flows through between the gas-liquid separator 40 and the cooling portion 30. The liquid accumulator 70 retains the liquid-phase refrigerant in a saturated liquid state, which has been separated by the gas-liquid separator 40. The high-pressure refrigerant flowing through the refrigerant passage 34 flows into the liquid accumulator 70, and the liquid accumulator 70 accumulates the refrigerant liquid that has flowed thereinto. When the pressure of the refrigerant that flows through the refrigerant passage 34 falls, the refrigerant liquid in the liquid accumulator 70 flows out from the liquid accumulator 70 to the refrigerant passage 34, and restrains the flow rate of the refrigerant liquid supplied to the cooling portion 30 from decreasing.

A check valve 79 is arranged between the gas-liquid separator 40 and the liquid accumulator 70. The check valve 79 prevents the refrigerant liquid that flows out from the liquid accumulator 70 from flowing backward to the gas-liquid separator 40. The check valve 79 is provided such that the refrigerant surely flows toward the cooling portion 30 instead of flowing to the gas-liquid separator 40 side when flowing to the refrigerant passage 34 after being discharged from the liquid accumulator 70. The check valve 79 allows the liquid-phase refrigerant to flow from the gas-liquid separator 40 toward the cooling portion 30, and prohibits the liquid-phase refrigerant that flows out from the liquid accumulator 70 from flowing toward the gas-liquid separator 40.

Figure 3:
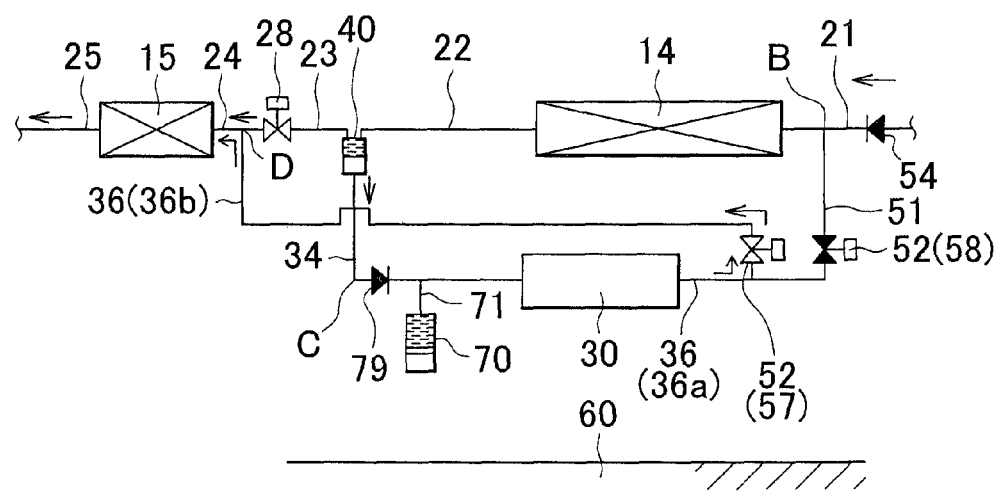
FIG. 3 is a schematic view showing the flow of the refrigerant for cooling an HV apparatus during the operation of the vapor compression refrigeration cycle.

FIG. 3 is a schematic view showing the flow of the refrigerant that cools the HV apparatus 31 during the operation of the vapor compression refrigeration cycle 10. FIG. 3 shows the flow of the refrigerant in the case where the vapor compression refrigeration cycle 10 is operated, namely, in the case where the compressor 12 is operated to cause the refrigerant to flow through the entire vapor compression refrigeration cycle 10.

FIG. 3 shows a state during the operation of an air-conditioner, namely, a state in which the compressor 12 is driven to keep the vapor compression refrigeration cycle 10 in operation. During the operation of the air-conditioner, the valve opening degree of the flow rate adjusting valve 28 is adjusted such that a sufficient amount of the refrigerant flows through the cooling portion 30. The changeover valves 52 are so operated as to cause the refrigerant to flow through from the cooling portion 30 to the expansion valve 16 via the heat exchanger 15. That is, by fully opening the valve 57 and fully closing the valve 58, the route of the refrigerant is selected such that the refrigerant flows through the entire cooling system 1. Thus, the cooling system 1 can ensure the cooling capacity of the vapor compression refrigeration cycle 10, and efficiently cool the HV apparatus 31.

Figure 4:
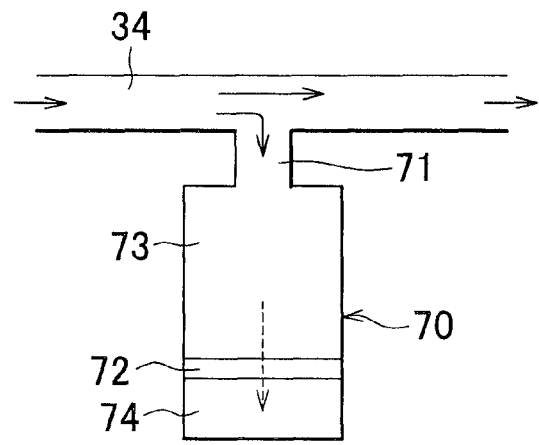
FIG. 4 is an enlarged view showing the details of a liquid accumulator shown in FIG. 3.

FIG. 4 is an enlarged view showing the details of the liquid accumulator 70 shown in FIG. 3. The liquid accumulator 70 and the refrigerant passage 34 are connected to each other via a connection portion 71. The liquid-phase refrigerant can flow from the refrigerant passage 34 into the liquid accumulator 70 via the connection portion 71. Also, the liquid-phase refrigerant can flow out from the liquid accumulator 70 to the refrigerant passage 34 via the connection portion 71.

The liquid accumulator 70 is formed to be hollow, and a movable partition portion 72 is arranged inside the liquid accumulator 70. The movable partition portion 72 can freely move in a direction toward or away from the refrigerant passage 34, so as to change the distance from the refrigerant passage 34 to the movable partition portion 72. The movable partition portion 72 divides the inner space of the liquid accumulator 70 into a liquid accommodation portion 73 in which the refrigerant is accommodated, and a gas encapsulation portion 74 in which a gas is encapsulated. The liquid accommodation portion 73 communicates with the refrigerant passage 34 via the connection portion 71. The gas encapsulation portion 74 is sealed to prevent a compressible gas infused thereinto, such as nitrogen or the like, from leaking out.

Due to the movement of the movable partition portion 72 in the direction away from the refrigerant passage 34, the volume of the liquid accommodation portion 73 relatively increases, and the volume of the gas encapsulation portion 74 relatively decreases. At this time, the amount of the refrigerant liquid accumulated in the liquid accommodation portion 73 has increased, and the gas in the gas encapsulation portion 74 has been compressed to cause a rise in the internal pressure of the gas encapsulation portion 74.

Due to the movement of the movable partition portion 72 in the direction toward the refrigerant passage 34, the volume of the liquid accommodation portion 73 relatively decreases, and the volume of the gas encapsulation portion 74 relatively increases. At this time, the amount of the refrigerant liquid accumulated in the liquid accommodation portion 73 has decreased, and the gas in the gas encapsulation portion 74 has expanded to cause a fall in the internal pressure of the gas encapsulation portion 74.

During the operation of the air-conditioner shown in FIG. 3, since the compressor 12 is in operation, the high-pressure refrigerant in a saturation liquid state flows through the refrigerant passage 34. Thus, the refrigerant flows through the refrigerant passage 34 in a direction indicated by arrows in FIG. 4. At this time, a part of the refrigerant directly flows from the gas-liquid separator 40 to the cooling portion 30 via the refrigerant passage 34, and a part of the refrigerant flows from the refrigerant passage 34 into the liquid accommodation portion 73 of the liquid accumulator 70 to be retained in the liquid accommodation portion 73.

By raising the pressure of the refrigerant by the compressor 12 to create a pressure difference between the refrigerant passage 34 and the interior of the liquid accumulator 70, the liquid accumulator 70 can be filled with the refrigerant liquid. Thus, no additional power for causing the refrigerant to flow into the liquid accumulator 70 is required. Due to the flow of the high-pressure refrigerant liquid into the liquid accommodation portion 73, the refrigerant liquid applies a pressure to the movable partition portion 72, and the movable partition portion 72 moves away from the refrigerant passage 34 as indicated by a dotted arrow in FIG. 4. Thus, the cooling system 1 can retain a larger amount of the refrigerant liquid in the liquid accumulator 70.

Figure 5:
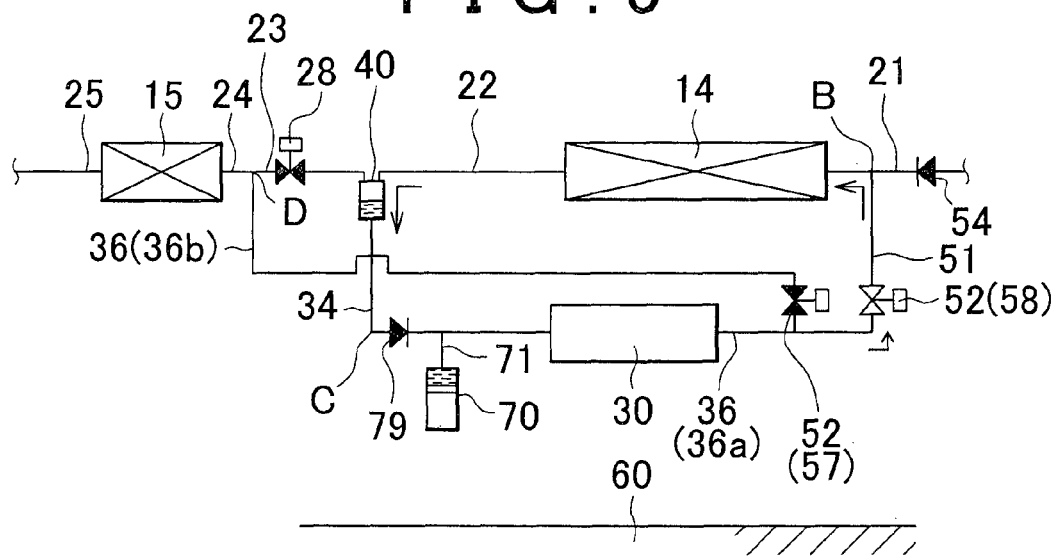
FIG. 5 is a schematic view showing the flow of the refrigerant for cooling the HV apparatus during the stoppage of the vapor compression refrigeration cycle.

FIG. 5 is a schematic view showing the flow of the refrigerant that cools the HV apparatus 31 during the stoppage of the vapor compression refrigeration cycle 10. FIG. 5 shows the flow of the refrigerant in the case where the vapor compression refrigeration cycle 10 is stopped, namely, in the case where the compressor 12 is stopped to cause the refrigerant to circulate via an annular route that couples the cooling portion 30 and the heat exchanger 14 to each other.

FIG. 5 shows a state during the operation of a heat pipe, namely, a state in which the compressor 12 is stopped to keep the vapor compression refrigeration cycle 10 stopped. During the operation of the heat pipe, the changeover valves 52 are so operated as to cause the refrigerant to circulate from the cooling portion 30 to the heat exchanger 14. That is, by fully closing the valve 57, fully opening the valve 58, and besides, fully closing the flow rate adjusting valve 28, the refrigerant flows through via the communication channel 51 instead of flowing to the refrigerant passage 36b. Thus, a closed annular route is formed in the cooling system 1. In the annular route, the refrigerant flows from the heat exchanger 14, flows sequentially via the refrigerant passage 22 and the refrigerant passage 34, reaches the cooling portion 30, and further flows sequentially via the refrigerant passage 36a, the communication channel 51, and the refrigerant passage 21, and returns to the heat exchanger 14.

The cooling system 1 can cause the refrigerant to circulate between the heat exchanger 14 and the cooling portion 30 via this annular route, without operating the compressor 12. In cooling the HV apparatus 31, the refrigerant receives evaporative latent heat from the HV apparatus 31 to evaporate. The refrigerant vapors gasified through heat exchange with the HV apparatus 31 flow to the heat exchanger 14 sequentially via the refrigerant passage 36a, the communication channel 51, and the refrigerant passage 21. In the heat exchanger 14, due to a wind blowing against a windshield of the vehicle or ventilation from a radiator fan for cooling the engine, the refrigerant vapors are cooled to condense. The refrigerant liquid liquefied by the heat exchanger 14 returns to the cooling portion 30 via the refrigerant passages 22 and 34.

In this manner, the heat pipe that has the HV apparatus 31 as a heating portion and the heat exchanger 14 as a cooling portion is formed by the annular route that extends via the cooling portion 30 and the heat exchanger 14. Accordingly, even when the vapor compression refrigeration cycle 10 is stopped, namely, when the vehicle is stopped from being cooled, the cooling system 1 can reliably cool the HV apparatus 31, without having to activate the compressor 12. Because there is no need to constantly operate the compressor 12 to cool the HV apparatus 31, the cooling system 1 can reduce the power consumption of the compressor 12 to improve the fuel economy of the vehicle. In addition, because the life of the compressor 12 can be prolonged, the cooling system 1 can enhance the reliability of the compressor 12.

Each of FIGS. 3 and 5 shows a ground 60. In a vertical direction perpendicular to the ground 60, the cooling portion 30 is arranged below the heat exchanger 14. In the annular route through which the refrigerant is caused to circulate between the heat exchanger 14 and the cooling portion 30, the cooling portion 30 is arranged below, and the heat exchanger 14 is arranged above. The heat exchanger 14 is arranged at a position higher than the cooling portion 30.

In this case, the refrigerant vapors heated and gasified by the cooling portion 30 ascend in the annular route, reach the heat exchanger 14, are cooled in the heat exchanger 14, are condensed to become the liquid refrigerant, descend in the annular route due to the effect of the gravity, and return to the cooling portion 30. That is, the cooling portion 30, the heat exchanger 14, and the refrigerant route that couples these components to each other form a thermo-syphon heat pipe. Since the heat transfer efficiency from the HV apparatus 31 to the heat exchanger 14 can be enhanced through the formation of the heat pipe, the cooling system 1 can more efficiently cool the HV apparatus 31 without applying a power, even when the vapor compression refrigeration cycle 10 is stopped.

As the changeover valves 52 that change the communication states between the communication channel 51 and the refrigerant passages 21 and 36, the aforementioned pair of the valves 57 and 58, or a three-way valve arranged at the branching point between the refrigerant passage 36 and the communication channel 51 may be employed. In any case, both during the operation of the vapor compression refrigeration cycle 10 and during the stoppage of the vapor compression refrigeration cycle 10, the cooling system 1 can efficiently cool the HV apparatus 31. The valves 57 and 58 are only required to have a simple structure that allows the refrigerant passages to be opened/closed, and hence are inexpensive. The cooling system 1 that is lower in cost can be provided by employing the two valves 57 and 58. On the other hand, the space required for the arrangement of the three-way valve is considered to be smaller than the space required for the arrangement of the two valves 57 and 58. The cooling system 1 that is made more compact and more excellent in vehicle mountability can be provided by employing the three-way valve.

The cooling system 1 further includes a check valve. 54. The check valve 54 is arranged in the refrigerant passage 21 between the compressor 12 and the heat exchanger 14, at a position that is closer to the compressor 12 than a connection point of the refrigerant passage 21 and the communication channel 51. The check valve 54 allows the refrigerant to flow from the compressor 12 toward the heat exchanger 14, and prohibits the refrigerant from flowing in the opposite direction. In this manner, during the operation of the heat pipe as shown in FIG. 5, the cooling system 1 can reliably form a closed-loop refrigerant route through which the refrigerant is caused to circulate between the heat exchanger 14 and the cooling portion 30.

If the check valve 54 is not provided, the refrigerant may flow from the communication channel 51 to the refrigerant passage 21 on the compressor 12 side. Since the cooling system 1 includes the check valve 54, the cooling system 1 can reliably prohibit the refrigerant from flowing from the communication channel 51 toward the compressor 12 side, and hence can prevent the capacity to cool the HV apparatus 31 from deteriorating during the stoppage of the vapor compression refrigeration cycle 10, which employs the heat pipe formed by the annular refrigerant route. Accordingly, even when the cabin of the vehicle is stopped from being cooled, the HV apparatus 31 can be efficiently cooled.

Further, when the amount of the refrigerant in the closed-loop refrigerant route is insufficient during the stoppage of the vapor compression refrigeration cycle 10, the compressor 12 is operated only for a short time, so that the cooling system 1 can supply the refrigerant to the closed-loop route via the check valve 54. Thus, the amount of the refrigerant in the closed loop can be increased, and the amount of heat exchange treatment by the heat pipe can be increased. Accordingly, the cooling system 1 can ensure the amount of the refrigerant in the heat pipe, and hence can prevent the HV apparatus 31 from being insufficiently cooled due to an insufficiency in the amount of the refrigerant.

Figure 6:
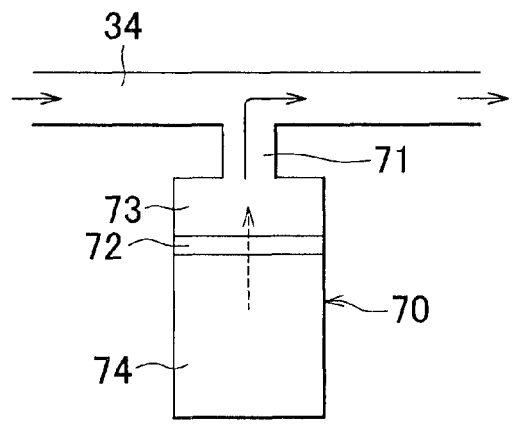
FIG. 6 is an enlarged view showing the details of the liquid accumulator shown in FIG. 5.

FIG. 6 is an enlarged view showing the details of the liquid accumulator 70 shown in FIG. 5. During the operation of the heat pipe, the compressor 12 is stopped.

A driving force for moving the refrigerant in the closed-loop refrigerant route that forms the thermo-syphon heat pipe includes only a gravitational force applied to the refrigerant in a liquid state, and a buoyant force applied to the refrigerant in a gaseous state. The driving force applied to the refrigerant is smaller during the operation of the heat pipe than during the operation of the air-conditioner. In particular, there is an apprehension that the refrigerant may gasify to cause an insufficiently cooled state (a dried out state) of the HV apparatus 31 instead of being supplied to the cooling portion 30, immediately after the compressor 12 is stopped to make a changeover from the state during the operation of the air-conditioner to the state during the operation of the heat pipe.

In the cooling system 1 according to this embodiment of the invention, the liquid accumulator 70 is arranged upstream of the cooling portion 30, and the refrigerant liquid is retained in the liquid accumulator 70 during the operation of the compressor 12. When a changeover to the state during the operation of the heat pipe is made, the compressor 12 is stopped, and therefore, the pressure of the refrigerant flowing through the refrigerant passage 34 relatively falls. When the pressure of the refrigerant flowing through the refrigerant passage 34 becomes lower than the pressure of the liquid-phase refrigerant retained in the liquid accumulator 70, the refrigerant flows out from the liquid accommodation portion of the liquid accumulator 70 to the refrigerant passage 34 in a direction indicated by arrows shown in FIG. 6. The refrigerant flows out from the liquid accumulator 70, and the amount of the refrigerant liquid retained in the liquid accommodation portion 73 decreases, so that the pressure applied to the movable partition portion 72 from the refrigerant liquid falls. Thus, the movable partition portion 72 moves toward the refrigerant passage 34 as indicated by a dotted arrow shown in FIG. 6.

When the compressor 12 is stopped to cause a decrease in the driving force of the refrigerant for cooling the HV apparatus 31 as a heat generation source, the refrigerant liquid is caused to flow through from the liquid accumulator 70 to the refrigerant passage 34, and the flow rate of the liquid-phase refrigerant supplied to the cooling portion 30 is restrained from decreasing. By thus supplementing the refrigerant liquid, the cooling system 1 can ensure the flow rate of the refrigerant in a liquid phase state, which flows to the cooling portion 30. Therefore, the cooling system 1 can restrain the capacity to cool the HV apparatus 31 from decreasing at the time of startup during the operation of the heat pipe, ensure the performance of cooling the HV apparatus 31, and stably cool the HV apparatus 31. Accordingly, the occurrence of a dried-out state can be suppressed, or a dried-out state can be eliminated at an early stage even if it occurs. Therefore, the temperature of the HV apparatus 31 can be effectively restrained from rising.

Second Embodiment

Figure 7:
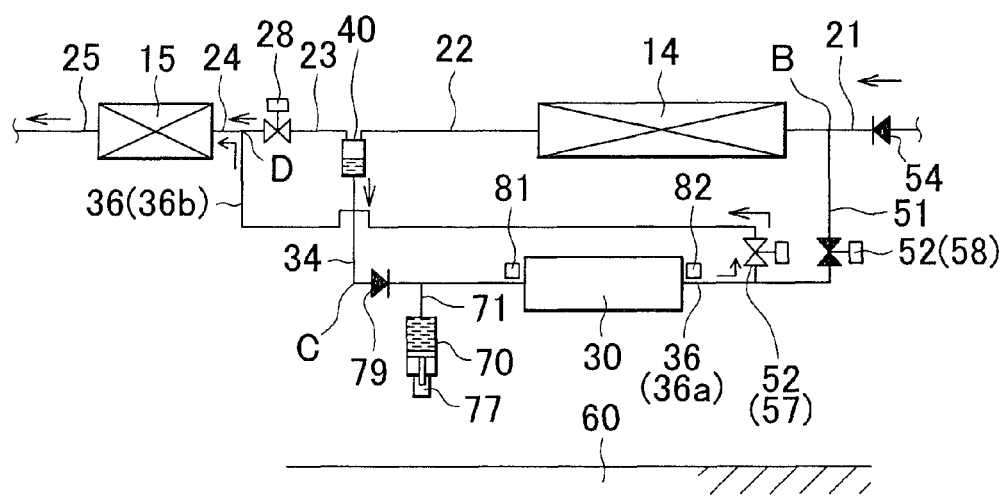
FIG. 7 is a schematic view showing the flow of a refrigerant for cooling an HV apparatus during the operation of a vapor compression refrigeration cycle in a cooling system according to the second embodiment of the invention.

FIG. 7 is a schematic view showing the flow of the refrigerant that cools the HV apparatus 31 during the operation of the vapor compression refrigeration cycle 10 in a cooling system according to the second embodiment of the invention. The cooling system according to the second embodiment of the invention is different from the cooling system according to the first embodiment of the invention in that a drive portion 77 for forcibly driving a movable partition portion 75 arranged in the liquid accumulator 70 is provided. Because the cooling system includes the drive portion 77, the cooling system according to the second embodiment of the invention can positively move the refrigerant liquid from the refrigerant passage 34 into the liquid accumulator 70, or can positively move the refrigerant liquid from inside the liquid accumulator 70 to the refrigerant passage 34.

A temperature sensor 81 for measuring the temperature of the refrigerant is arranged upstream of the cooling portion 30 with respect to the flow of the refrigerant into the cooling portion 30. A temperature sensor 82 for measuring the temperature of the refrigerant is arranged downstream of the cooling portion 30 with respect to the flow of the refrigerant. By measuring the difference between the temperature of the refrigerant that flows into the cooling portion 30 and the temperature of the refrigerant that flows out from the cooling portion 30 using the temperature sensors 81 and 82, the cooling state of the HV apparatus 31 as a heat generation source can be grasped.

That is, when the entire refrigerant liquid evaporates in the cooling portion 30 and all the refrigerant becomes refrigerant vapors, the refrigerant vapors further receive sensible heat from the HV apparatus 31, and the temperature of the refrigerant vapors thereby rises. In a state where the entire refrigerant has gasified in the cooling portion 30, the amount of heat exchange between the refrigerant and the HV apparatus 31 decreases, so that the HV apparatus 31 cannot be efficiently cooled.

Thus, if the temperature of the refrigerant at the outlet of the cooling portion 30, which is measured by the temperature sensor 82, is substantially equal to the temperature of the refrigerant at the inlet of the cooling portion 30, which is measured by the temperature sensor 81, the capacity to cool the HV apparatus 31 is sufficiently ensured. On the other hand, when the temperature of the refrigerant at the outlet of the cooling portion 30 becomes higher than the temperature of the refrigerant at the inlet of the cooling portion 30, the entire refrigerant has gasified in the cooling portion 30, so that the capacity to cool the HV apparatus 31 has decreased. When the value of the difference between the temperatures at the outlet and inlet of the cooling portion 30 exceeds a predetermined threshold, a sufficient amount of the refrigerant liquid has not been supplied to the HV apparatus 31, and an additional amount of the refrigerant liquid needs to be supplied to the cooling portion 30.

When it is determined that the refrigerant liquid needs to be supplied to the cooling portion 30, the movable partition portion 75 is moved by the drive portion 77, the liquid-phase refrigerant is force-fed from the liquid accommodation portion 73 of the liquid accumulator 70 to the refrigerant passage 34, and the refrigerant liquid is supplied to the cooling portion 30. The drive portion 77 functions as a discharge portion that moves the movable partition portion 75 to reduce the volume of the liquid accommodation portion 73 and forcibly discharges the refrigerant from the liquid accumulator 70.

In this manner, when it is determined that the capacity to cool the HV apparatus 31 is insufficient, the liquid-phase refrigerant can be forcibly discharged immediately from the liquid accumulator 70 and supplied to the cooling portion 30. Therefore, the cooling system can recover the capacity to cool the HV apparatus 31 at an early stage, and can restrain an inconvenience of overheat of the HV apparatus 31 from being caused due to the occurrence of a dried-out state. For example, in the case where the load of the HV apparatus 31 abruptly increases to cause an abrupt increase in the heat generation amount of the HV apparatus 31 when the vehicle runs uphill etc., the cooling system can forcibly supply the refrigerant liquid from the liquid accumulator 70 to the cooling portion 30.

It should be noted that it may be determined whether or not the refrigerant liquid needs to be supplied from the liquid accumulator 70 to the cooling portion 30 by arranging a pair of pressure sensors at the outlet and inlet of the cooling portion 30 respectively and monitoring the pressures of the refrigerant flowing into the cooling portion 30 and the refrigerant flowing out from the cooling portion 30, instead of monitoring the temperatures at the outlet and inlet of the cooling portion 30 by the temperature sensors 81 and 82 respectively.

Figure 8:
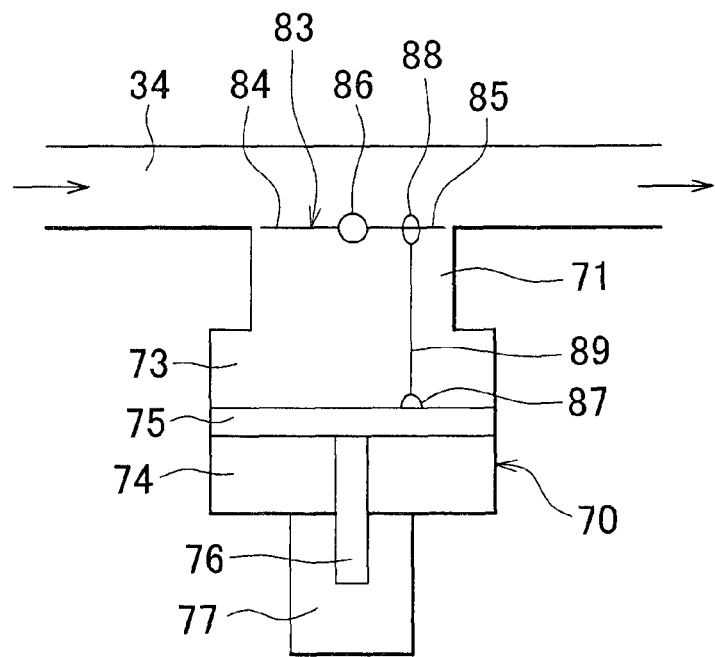
FIG. 8 is a first schematic view showing the flow of a liquid-phase refrigerant from/into a liquid accumulator in the second embodiment of the invention.
Figure 9:
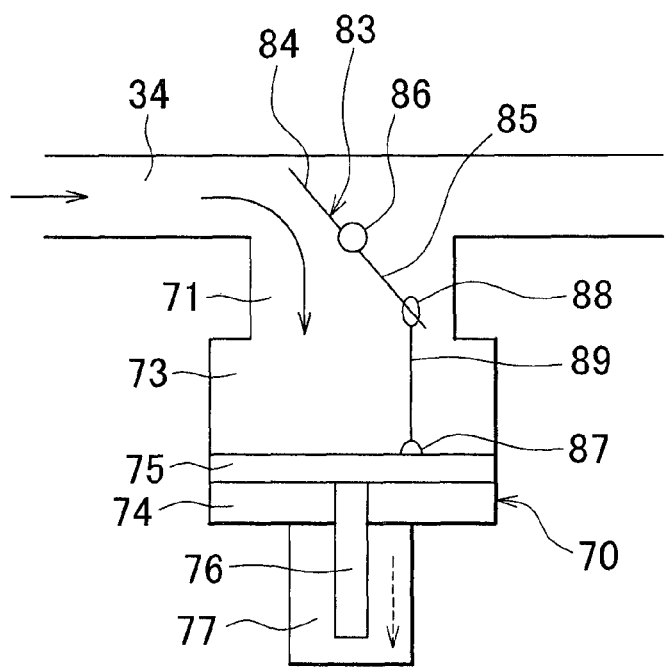
FIG. 9 is a second schematic view showing the flow of the liquid-phase refrigerant from/into the liquid accumulator in the second embodiment of the invention.
Figure 10:
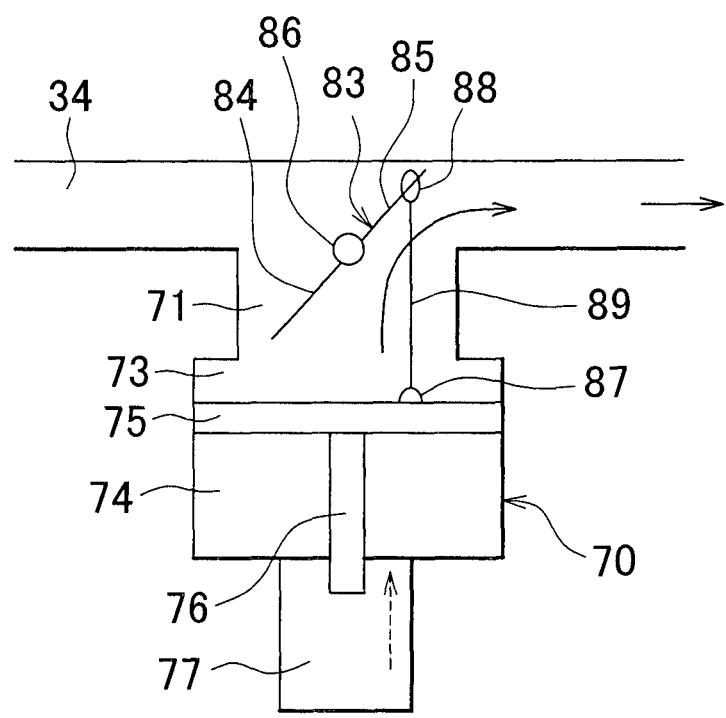
FIG. 10 is a third schematic view showing the flow of the liquid-phase refrigerant from/into the liquid accumulator in the second embodiment of the invention.

FIGS. 8 to 10 are schematic views showing the flow of the liquid-phase refrigerant into and out from the liquid accumulator 70 of the second embodiment of the invention. As shown in FIGS. 8 to 10, the movable partition portion 75 separates the liquid accommodation portion 73 and the gas encapsulation portion 74 from each other, as is the case with the first embodiment of the invention. The drive portion 77 that generates a driving force for driving the movable partition portion 75 is arranged on an side that is away from the refrigerant passage 34 with respect to the gas encapsulation portion 74 (i.e., an opposite side of the gas encapsulation portion 74 from the refrigerant passage 34). It should be noted that although the gas encapsulation portion 74 is designed as a sealed space so as to move the movable partition portion 75 through the internal pressure of the gas with which the gas encapsulation portion 74 is filled in the liquid accumulator 70 of the first embodiment of the invention, the gas encapsulation portion 74 may not be formed as a sealed space in the second embodiment of the invention because the movable partition portion 75 is moved by the drive portion 77.

A power transmission shaft 76 extends from the movable partition portion 75 to the drive portion 77. One end of the power transmission shaft 76 is fixed to the movable partition portion 75, and the other end of the power transmission shaft 76 is arranged in the drive portion 77. The power transmission shaft 76 receives, on the other end side thereof, a driving force from the drive portion 77, and moves the movable partition portion 75 toward or away from the refrigerant passage 34. The drive portion 77 may electrically drive the movable partition portion 75 via the power transmission shaft 76 by, for example, moving the power transmission shaft 76 through electric energy. The movable partition portion 75, the power transmission shaft 76, and the drive portion 77 may constitute a plunger pump.

A valve 83 is provided to regulate the flow of the refrigerant between the refrigerant passage 34 and the connection portion 71. The valve 83 has a pair of valve bodies 84 and 85. The valve body 84 and the valve body 85 are connected to a fixed shaft 86. The valve bodies 84 and 85 are so provided around the fixed shaft 86 movably therearound. An interlock shaft 89 is arranged between the valve body 85 and the movable partition portion 75. One end of the interlock shaft 89 is fixed to the movable partition portion 75 at a fixation portion 87. As the movable partition portion 75 moves, the interlock shaft 89 also moves. The other end side of the interlock shaft 89 is engaged with the valve body 85 movably relatively to the valve body 85 at an engagement portion 88. The engagement portion 88 is provided slideably relatively to the valve body 85 in a direction toward or away from the fixed shaft 86.

In a normal state shown in FIG. 8, the refrigerant passage 34 and the connection portion 71 are separated from each other by the valve 83. As indicated by arrows in FIG. 8, the refrigerant flows from the gas-liquid separator 40 toward the cooling portion 30. Since the valve 83 prevents communication between the refrigerant passage 34 and the connection portion 71, the refrigerant flowing through the refrigerant passage 34 is restrained from flowing into the liquid accumulator 70, and the refrigerant retained in the liquid accumulator 70 is restrained from flowing out to the refrigerant passage 34.

In a state where the refrigerant is drawn into the liquid accumulator 70 as shown in FIG. 9, the power transmission shaft 76 is moved by the drive portion 77 in a direction away from the refrigerant passage 34 as indicated by a dotted arrow in FIG. 9. As the power transmission shaft 76 moves, the movable partition portion 75 fixed to the power transmission shaft 76 also moves. Furthermore, as the movable partition portion 75 moves, the interlock shaft 89 fixed to the movable partition portion 75 via the fixation portion 87 also moves. At this time, the valve body 85 engaged with the interlock shaft 89 rotationally moves around the fixed shaft 86 clockwise in FIG. 9. Thus, the valve body 84 also rotationally moves around the fixed shaft 86 clockwise in FIG. 9.

Due to the movements of these valve bodies 84 and 85, the portion of the refrigerant passage 34, which is located upstream of the liquid accumulator 70 (i.e., on the side close to the gas-liquid separator 40), communicates with the liquid accumulator 70. Since the refrigerant passage 34 and the liquid accumulator 70 communicate with each other, the refrigerant flows into the liquid accommodation portion 73 of the liquid accumulator 70 as indicated by arrows in FIG. 9. Because the valve 83 regulates the direction of flow of the refrigerant, the cooling system can restrain the refrigerant from being drawn into the liquid accumulator 70 from the cooling portion 30 side located downstream of the liquid accumulator 70 (i.e., the side close to the cooling portion 30). At this time, the movable partition portion 75 has been moved away from the refrigerant passage 34 by the drive portion 77. Therefore, there is realized a configuration that allows a larger amount of the refrigerant liquid to be retained in the liquid accommodation portion 73.

In a state where the refrigerant is discharged from the liquid accumulator 70 as shown in FIG. 10, the power transmission shaft 76 is moved in a direction toward the refrigerant passage 34 by the drive portion 77 as indicated by a dotted arrow in FIG. 10. As the power transmission shaft 76 moves, the movable partition portion 75 fixed to the power transmission shaft 76 moves as well. Furthermore, as the movable partition portion 75 moves, the interlock shaft 89 fixed to the movable partition portion 75 via the fixation portion 87 moves as well. At this time, the valve body 85 engaged with the interlock shaft 89 rotationally moves around the fixed shaft 86 counterclockwise in FIG. 10. Thus, the valve body 84 also rotationally moves around the fixed shaft 86 counterclockwise in FIG. 10.

Due to the movements of these valve bodies 84 and 85, the refrigerant passage 34 located downstream of the liquid accumulator 70 communicates with the liquid accumulator 70. Thus, as indicated by arrows in FIG. 10, the refrigerant flows out from the liquid accommodation portion 73 of the liquid accumulator 70, is force-fed to the refrigerant passage 34, and flows toward the cooling portion 30. Due to the provision of the check valve 79, the refrigerant is prevented from flowing backward to the gas-liquid separator 40 side. In addition, the valve 83 regulates the direction of flow of the refrigerant. Therefore, the cooling system can reliably deliver the refrigerant from the liquid accumulator 70 toward the cooling portion 30.

The movable partition portion 75 may be arranged at an optimal position between positions shown in FIGS. 9 and 10. For example, when force-feeding the refrigerant liquid from the liquid accumulator 70 to the cooling portion 30, the cooling system controls the amount of movement of the movable partition portion 75 by the drive portion 77, and thereby optimally adjusts the amount of the refrigerant liquid supplied to the cooling portion 30. Further, for example, by adjusting the position of the movable partition portion 75, the cooling system can adjust the opening degree of the valve 83 such that only a part of the refrigerant flowing from the gas-liquid separator 40 toward the cooling portion 30 flows into the liquid accumulator 70 when the refrigerant liquid is entirely discharged from the liquid accumulator 70 and the liquid accumulator 70 becomes void. Due to the adjustment of the opening degree of this valve 83, the cooling system prevents the entire refrigerant from flowing from the gas-liquid separator 40 into the liquid accumulator 70, and makes it possible to reliably cool the HV apparatus 31 by continuing to supply the refrigerant liquid to the cooling portion 30.

It should be noted that the cooling system 1 that cools the electric apparatus mounted on the vehicle, whose example is the HV apparatus 31, has been described in each of the foregoing embodiments of the invention. The electric apparatus is not limited to an exemplified electric apparatus such as an inverter, a motor-generator or the like, as long as it at least generates heat through operation. The electric apparatus may be any type of electric apparatus. In the case where there are a plurality of electric apparatuses to be cooled, the plurality of the electric apparatuses are desired to have a common cooling target temperature range. The cooling target temperature range is a temperature range suitable as a temperature environment in which the electric apparatuses are operated.

Although the embodiments of the invention have been described above, the embodiments of the invention disclosed herein are exemplary in all respects, and should be considered to be nonrestrictive. The scope of this invention is not defined by the foregoing description but by the claims. The invention is intended to encompass all modifications that are equivalent in significance and scope to the claims.

The cooling system according to the invention is particularly advantageously applicable to the cooling of an electric apparatus that employs a vapor compression refrigeration cycle for cooling the interior of a cabin of a vehicle such as a hybrid vehicle, a fuel cell-powered vehicle, an electric vehicle or the like, which is provided with electric apparatuses such as a motor-generator, an inverter and the like.

The invention claimed is:

1. A cooling system that cools a heat generator, comprising:
    a compressor that circulates a refrigerant;
    a first heat exchanger that carries out heat exchange between the refrigerant and outside air;
    an expansion valve that reduces a pressure of the refrigerant;
    a second heat exchanger that carries out heat exchange between the refrigerant and air-conditioning air;
    a portion of a refrigerant passage that cools the heat generator using the refrigerant that flows between the first heat exchanger and the expansion valve;
    a gas-liquid separator that separates the refrigerant that flows between the first heat exchanger and the portion of the refrigerant passage, into a liquid-phase refrigerant and a gas-phase refrigerant; and
    a liquid accumulator that is provided between the gas-liquid separator and the portion of the refrigerant passage, and that retains at least a portion of the liquid-phase refrigerant separated by the gas-liquid separator.

2. The cooling system according to claim 1, wherein the liquid-phase refrigerant flows into the liquid accumulator to be retained in the liquid accumulator during operation of the compressor, and flows out from the liquid accumulator to flow to the portion of the refrigerant passage during stoppage of the compressor.

3. The cooling system according to claim 1, further comprising a discharge portion that forcibly discharges the liquid-phase refrigerant from the liquid accumulator.

4. The cooling system according to claim 3, further comprising:
    a first temperature sensor that is arranged upstream with respect to flow of the refrigerant that flows into the portion of the refrigerant passage, and that measures a temperature of the refrigerant; and
    a second temperature sensor that is arranged downstream with respect to flow of the refrigerant that flows out from the portion of the refrigerant passage, and that measures a temperature of the refrigerant,
    wherein a cooling control of the heat generator is performed on the basis of the temperatures measured by the first temperature sensor and the second temperature sensor.

5. The cooling system according to claim 4, wherein the refrigerant is supplied to the portion of the refrigerant passage when a value of a difference between the temperatures measured by the first temperature sensor and the second temperature sensor exceeds a predetermined threshold.

6. The cooling system according to claim 1, further comprising
    a check valve that prohibits the liquid-phase refrigerant that flows out from the liquid accumulator from flowing to the gas-liquid separator.

7. The cooling system according to claim 1, wherein the liquid accumulator includes a movable partition portion that divides an inner space of the liquid accumulator into a liquid accommodation portion in which the refrigerant is accommodated and a gas encapsulation portion in which a gas is encapsulated.

8. The cooling system according to claim 1, further comprising:
    a first passage through which the gas-phase refrigerant separated by the gas-liquid separator flows; and
    a second passage through which the liquid-phase refrigerant separated by the gas-liquid separator flows, wherein the first passage and the second passage are connected in parallel with each other in a route of the refrigerant between the gas-liquid separator and the expansion valve, and wherein the heat generator is cooled by the liquid-phase refrigerant that flows through the second passage.

9. The cooling system according to claim 8, further comprising:

a third passage through which the refrigerant flows between the compressor and the first heat exchanger; and a communication channel that establishes communication between the third passage and a side of the second passage, the side being located closer to the expansion valve than the portion of the refrigerant passage.

10. The cooling system according to claim 9, further comprising a changeover valve that changes a communication state between the communication channel and the side of the second passage, the side being located closer to the expansion valve than the portion of the refrigerant passage.

11. The cooling system according to claim 10, wherein the changeover valve causes the refrigerant to flow to the communication channel during stoppage of the compressor.

* * * * *